United States Patent [19]
Vial et al.

[11] Patent Number: 4,786,143
[45] Date of Patent: Nov. 22, 1988

[54] DEVICE FOR ORIENTING AN OPTICAL COMPONENT

[75] Inventors: Jean-Claude Vial, Grenoble; André Carminati, Saint-Martin le Vinoux, both of France

[73] Assignee: Centre National de la Recherche Scientifique, Paris, France

[21] Appl. No.: 770,430

[22] Filed: Aug. 29, 1985

[30] Foreign Application Priority Data

Aug. 30, 1984 [FR] France .................... 84 13466

[51] Int. Cl.⁴ .................... G02B 27/00; G02B 7/02
[52] U.S. Cl. .................... 350/321; 350/252; 248/228
[58] Field of Search .............. 350/245, 247, 252, 321, 350/280, 282, 283, 276 R, 486, 487, 632–635; 248/228, 278

[56] References Cited

U.S. PATENT DOCUMENTS

| | | |
|---|---|---|
| 1,632,459 | 6/1927 | Valkenburgh . |
| 1,717,072 | 6/1929 | Stadt et al. .................... 350/283 |
| 2,420,259 | 5/1947 | McNamara .................... 350/280 |
| 3,596,863 | 8/1971 | Kaspareck .................... 248/228 |
| 3,700,313 | 10/1972 | Karr et al. .................... 350/633 |
| 3,814,365 | 6/1974 | MacKenzie . |
| 4,293,112 | 10/1981 | Horton . |

*Primary Examiner*—John K. Corbin
*Assistant Examiner*—Loha Ben
*Attorney, Agent, or Firm*—Staas & Halsey

[57] ABSTRACT

The device comprises a fixed base (1) and a support (3) for the optical component, together with at least one intermediate plate (2). These parts are hinged to one another by means of at least two independent hinge means each of which comprises a rod (13) co-operating with grooves (9, 10) provided respectively in facing plane faces of two of the parts (2, 3) for guiding said parts in rotation, screw adjustable abutment means (17, 18) for separating the plates (2, 3) from each other, and a resilient clip (14) placed astride the guide means (9, 10, 13) and the adjacent edges (11, 12) of the plates (2, 3) and urging them towards each other.

23 Claims, 2 Drawing Sheets

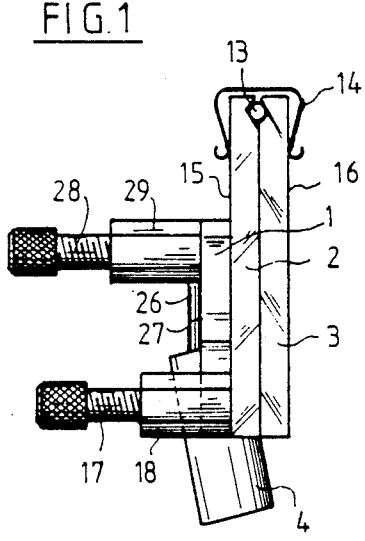
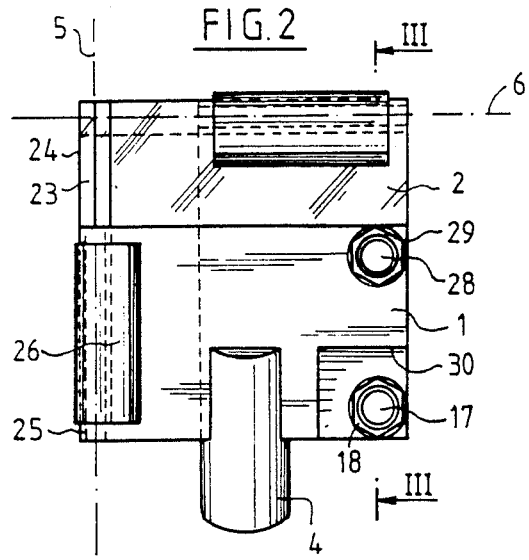
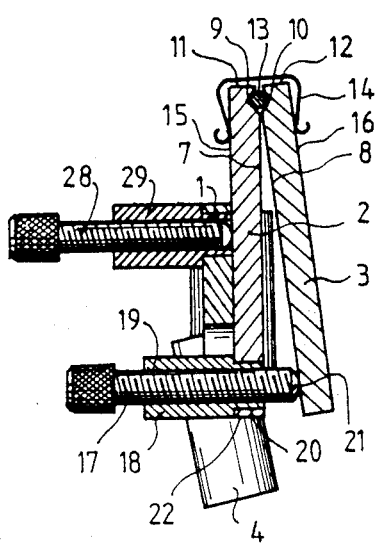
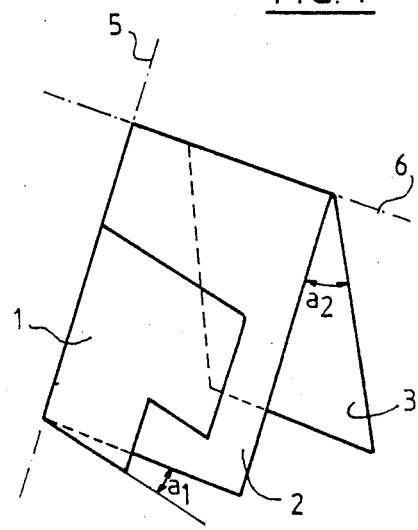

DEVICE FOR ORIENTING AN OPTICAL COMPONENT

The invention relates to a device for orienting an optical component, the device comprising a fixed base, a first plate for receiving the optical component, and a first hinge means for rotating the first plate together with the component about a first axis and relative to the base, and for maintaining the plate in a selected orientation.

BACKGROUND OF THE INVENTION

Devices of this nature are known and are designed to provide pure rotation without any translation. To this end, they use systems based on balls or on universal joints in which the same means or means in very close co-operation provide rotation about different axes. Such devices are very expensive and difficult to maintain.

Preferred embodiments of the present invention provide a device which is very versatile in use and which is cheap and easy both to manufacture and to maintain.

SUMMARY OF THE INVENTION

According to the present invention the hinge means in such a device comprises:

means in the form of a body of revolution whose axis constitute the axis of relative rotation between the base and the first plate;

contact surfaces belonging to the base and to the first plate and co-operating with said body of revolution;

resilient return means urging the contact surfaces against the surface of the body of revolution and urging the base and the first plate in relative rotation in one direction; and adjustable abutment means opposing the return action of the resilient return means.

BRIEF DESCRIPTION OF THE DRAWINGS

Embodiments of the invention are described by way of example with reference to the accompanying drawings, in which:

FIG. 1 is an elevation of a first orientation device in accordance with the invention and in a closed starting position;

FIG. 2 is a side view of the FIG. 1 device;

FIG. 3 is a section view on a line III—III of FIG. 2 through the device in an open position about one of its hinge axes;

FIG. 4 is a highly diagrammatical perspective view of the device in an open position;

MORE DETAILED DESCRIPTION

Figure 5:
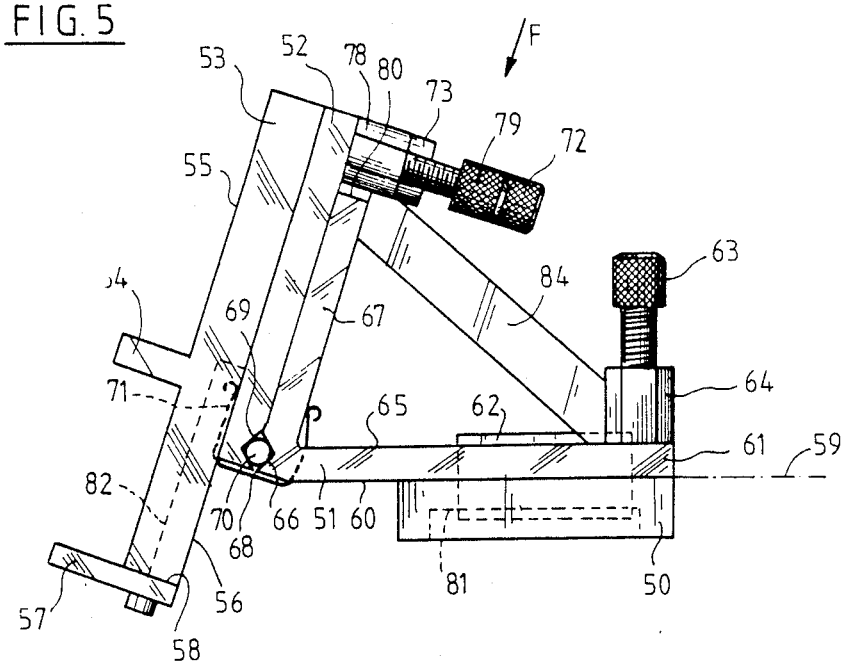
FIG. 5 is an elevation view of a second orientation device in accordance with the invention, in its starting or closed position.

The device shown in FIGS. 1 and 2 comprises a base 1, an intermediate plate 2 and a support 3 both of which are substantially plane and rectangular in shape. A cylindrical sleeve 4 has an axial tapped hole and is glued or welded to the base 1 in such a manner that its axis lies at an angle of a few degrees with the plane of the base.

The sleeve 4 is intended to be screwed to a vertical threaded rod on a stand, such that the base 1 occupies a fixed position in three dimensions and is slightly inclined to the vertical, while the support 3 is intended to receive an optical component whose orientation is to be adjusted.

To this end, the device includes a first hinge means to enable the intermediate plate 2 to be rotated relative to the base 1 about an axis 5, and a second hinge means for rotating the support 3 relative to the intermediate plate 2 about an axis 6, said axes 5 and 6 extending in different directions, and more particularly, being perpendicular to each other.

In the closed starting position shown in FIGS. 1 and 2, the plates 1, 2 and 3 are oriented in the same plane direction and they are substantially adjacent to one other in pairs.

The structure and operation of the second hinge means can be seen more particularly in FIG. 3. The facing faces 7 and 8 of the plates 2 and 3 have two respective grooves 9 and 10 of V-shaped cross-section, which grooves extend opposite each other along adjacent edges 11 and 12 of said plates. A rod 13 which is a cylindrical body of revolution is engaged in the grooves 9 and 10, and together therewith constitutes hinge means for guiding the parts 2 and 3 in rotation, with cooperation between the plane surfaces of the groove and the surface of the body of revolution of the rod defining relative motion such that the two parts rotate about the axis of the rod which is referenced 6.

The second hinge means also includes a resilient clip 14 placed astride the guide means and the edges 11 and 12 of the plates 2 and 3 and bearing against faces 15 and 16 thereof which are opposite to their respective faces 7 and 8. The clip 14 may be of the type sold under the name Aclé for mounting e.g. photographs behind glass. The clip 14 constitutes resilient return means tending to rotate the plates 2 and 3 so as to bring their faces 7 and 8 closer together, i.e. to return them towards the position shown in FIGS. 1 and 2. It also tends to apply the surfaces of the grooves 9 and 10 against the surface of the rod 13.

The second hinge means further includes adjustable abutment means for increasing the angle between the plates 2 and 3 and for maintaining said angle at a non-zero value in opposition to the action of the clip 14. These means comprise a screw 17 co-operating with a body 18 including a tapped hole 19, said body 18 projecting from the face of the plate 2 and being constituted by a tube fixed to said plate by being itself screwed into a tapped hole 20 in the plate. The face 8 of the support plate 3 bears against the curved end 21 of the screw 17.

The adjustable abutment means are mounted at a distance from the hinge axis and close to the edge 22 which is opposite to the edge 11 of the plate 2. The zones in which the clip 14 presses against the plates 2 and 3 are closer to the hinge means than are the adjustable abutment means, thereby enabling the clip 14 to provide contacts firstly between the surfaces of the grooves 9 and 10 and the surface of the rod 13, and secondly between the face 8 of the plate 3 and the end 21 of the screw 17.

The first hinge means for rotating the plate 2 relative to the base 1 is entirely similar to the second hinge means described above. It comprises a groove 23 in the face 15 of the plate 2 extending along an edge 24 thereof, a matching groove provided in the facing face of the base plate 1, and a cylindrical rod 25 co-operating with the surface of the grooves. A resilient clip 26 is placed astride the rod 25 together with the edges of the plates 1 and 2 and bears against the face 7 of the plate 2 and the face 27 of the plate 1, i.e. the face which is furthest from the plate 2. A screw 28 is screwed through a tapped cylinder 29 which projects from the face 27 of the plate 1 and which serves to move the plates 1 and 2 apart from each other. The cylinder 29 is fixed to the plate 1 close to the edge thereof which is opposite to the edge in which the groove is provided.

The base plate 1 includes a cutout 30 to pass the screw 17 and the cylinder 18.

FIG. 4 is a highly diagrammatic representation of the configuration of the device when the plate 2 is at non-zero angles a1 and a2 relative to the plates 1 and 3. By varying the angles a1 and a2 using the first and second hinge means, the support plate 3 may be oriented in such a manner that, for example, a light ray deflected by an optical component mounted on said support plate takes up any desired direction within a solid angle surrounding the position of the deflected ray which corresponds to an average position of the device, as defined by intermediate values of the angles a1 and a2. The inclination of the sleeve 4 relative to the base plate 1 serves, when the sleeve is vertical, to displace the plate 3 by varying the angle a2 on either side of the vertical position, and about an average position for the deflected ray which may then be horizontal.

Figure 6:
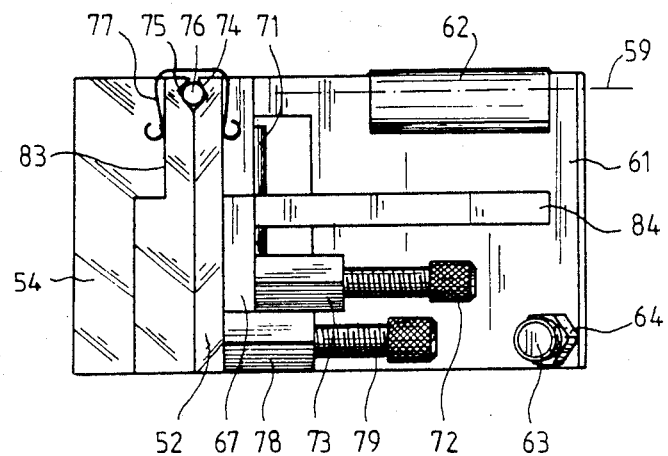
FIG. 6 is a view of the FIG. 5 device as seen along arrow F.

FIGS. 5 and 6 show a three-axis orientation device which comprises a base plate 50 for fixing horizontally to an optical bench, a first intermediate plate 51 which includes two plane portions at an angle to each other, a second intermediate plate 52 which comprises a single plane portion, and a support 53 for receiving a diffraction grating disposed between a rib 54 projecting from a plane face 55 of the support 53 facing away from a face 56 which faces the plate 52, and a tab 57 added to the edge 58 of the support 53 and extending parallel to the rib 54.

The components constituted by the base 50, the plates 51 and 52, and the support 53 may be oriented relative to one another by virtue of three hinge means similar to those described with reference to FIGS. 1 to 3.

A first hinge means is suitable for rotating the first intermediate plate 51 relative to the base 50 about an axis 59 and comprises a cylindrical rod which is a body of revolution about the axis 59, a V-shaped groove in the upper face of the base 50 and a groove in the outer face 60 facing the base 50 of one half 61 of the angle plate 51. A resilient clip 62 is fitted astride the axis 59 and the adjacent edges of the base 50 and the half 61. The abutment means comprise a screw 63 screwed into a cylinder 64 which projects from the inside face 65 of said half 61.

A second hinge means suitable for rotating the second intermediate plate 52 relative to the first intermediate plate 51 comprises a groove 66 in the outer face of the second half of the angle constituting the first intermediate plate 51, said groove running along adjacent to the ridge 68 where the two outer faces of the first intermediate plate meet. The groove 66 faces a matching groove 69 in the second plate 52 and together they co-operate with a cylindrical rod 70 whose axis constitutes the axis of relative rotation between the two intermediate plates, said axis being parallel to the ridge 68 and perpendicular to the first axis of rotation 59.

A resilient clip 71 is fitted astride the grooves 66 and 69, the rod 70 and the adjacent edges of the half 67 and the plate 52, and bears against opposing faces thereof to urge them towards each other. The adjustable abutment means comprise a screw 72 and a tapped cylinder 73 fitted to and projecting from the inside face of the half 67 of the first intermediate plate, close to the edge thereof furthest from the ridge 69.

In the hinge means for rotating the support 53 relative to the second intermediate plate 52, the groove in the plate 52, the groove in the support 53, the cylindrical rod, and the resilient clip are designated respectively by reference numerals 74, 75, 76, and 77. The axis of the rod 76, i.e. the axis of rotation of the hinge means, is situated substantially in the plane perpendicular to the axis of the rod 70 and containing the axis 59. The cylinder 78 receiving the screw 79 for adjusting the relative orientation of the parts 52 and 53 is fixed to the plate 52.

A cutout 80 is provided in the half 67 of the plate 51 to pass the cylinder 78 and the screw 79. A cutout 81 is also provided in the base 50 and two cutouts 82 and 83 are provided in the support 53 to partially receive the clips 62, 71, and 77, respectively.

The halves 61 and 67 of the angle plate are interconnected by a reinforcing strut 84. They are at an angle to each other of slightly less than a right angle in order to allow the support 53 to rock about either side of a vertical position.

In a device in accordance with the invention, the hinge means are controlled independently from one another by the rotating screws, thereby enabling each of the angles between two adjacent components taken from the base, the support, and the intermediate plate(s) to be individually adjusted. The various hinge means are thus completely separate from one another and each defines a single rotation movement.

Further, this design makes use of very simple mechanical means which are thus cheap and reliable and easy to use and maintain.

In order to dismantle two parts which are hinged to each other, it suffices to remove the resilient clip which holds them together. This makes it possible, in particular, to replace any one of the hinged parts very easily, e.g. to replace the base so as to fit the device to a different installation, or to replace the optical component support so as to match the device to some other kind of optical component. Indeed, it is often easier to replace a first support carrying a first optical component by a similar second support carrying a second component rather than to exchange optical components on the same support. Such component interchangeability does not exist with known devices in which multi-axis orientation means make the parts practically inseparable.

In addition to the above-mentioned advantages, a device in accordance with the invention has the further advantages of very large angular strokes, which may be 30° or more, and of short thicknesses to be passed through, e.g. about 10 mm, thereby making it very easy to obtain large optical apertures using semi-transparent components.

The invention also provides interchangeable parts capable of being assembled to constitute orientation devices as described above.

For example, such a part could comprise a plate having respective grooves in the two larger faces thereof and extending in different directions. A body having a tapped hole may project from one of the faces of the plate.

Another part in accordance with the invention is an angle plate whose two halves have respective grooves in their outside faces, one of these grooves extending along the ridge of the angle. The two halves are preferably at an angle of slightly less than a right angle, and may be provided with two respective bodies having tapped holes and projecting from the inside faces thereof. These tapped bodies are preferably situated adjacent to the edges furthest from the ridge of the angle.

In both of the types of part defined above, the two grooves preferably extend perpendicularly to each other.

An angle plate is particularly useful for use in a three-axis orientation device as described with reference to FIGS. 5 and 6. However, it is also useful in a two-axis device used for orienting a semi-transparent mirror. It then enables a light beam passing through the mirror applied against the support plate to pass through only two plates of the device, namely the support plate and one of the halves of the angle plate, rather than passing through all three plates 1, 2 and 3 as shown in the FIG. 1 device. This increases the optical aperture of the beam for apertures of given size through the plates.

In the devices described, the rotary guide means enable relative translation between the parts along the rod axes. Such latitude makes it possible to position the optical center of a component to be oriented at will. If such translation is undesirable, it can readily be eliminated by providing any suitable axial stop means.

Further, an angle slightly less than a right angle as described for the angle plate is advantageous when the optical surface to be oriented is parallel to the support on which the component having said surface is mounted. Otherwise, for example if the component is a prism, this relationship no longer holds and the angle of the angle plate may be equal to, greater than, or even much less than a right angle.

We claim:

1. A device for orienting an optical component, said device comprising:
   a first plate forming a fixed base having first and second faces;
   a second plate separable from said first plate and having first and second faces, for receiving the optical component relative to said first plate; and
   a first hinge means for rotating said second plate and the optical component relative to the first plate about a first axis of relative rotation and for maintaining the optical component at a selected orientation, said first hinge means including,
   first and second grooves formed in facing portions of the first face of the first plate and the first face of the second plate, respectively, said grooves formed along an edge of each of said first faces along said first axis of relative rotation between said first and second plates,
   a first body of revolution constituting the first axis of relative rotation between said first and second plates, said first body of revolution cooperating with surfaces of said first and second grooves,
   a first resilient return means including a U-shaped clip fitted astride said first body of revolution and bearing against the second face of the first plate and the second face of the second plate, said first resilient return means insuring contact between said first body of revolution and the surfaces of said grooves and urging return rotation between said first and second plates to a closed parallel position, removal of said first resilient return means permitting an easy replacement of said first and second plates; and
   a first adjustable abutment means opposing the return action of the first resilient return means of said first hinge means.

2. A device according to claim 1, wherein said first and second grooves are V-shaped in cross-section.

3. A device according to claim 1, wherein said first body of revolution comprises cylindrical rod.

4. A device according to claim 3, wherein said first adjustable abutment means is remote from the edges of said first and second plates near which said first hinge means is located.

5. A device according to claim 4, wherein said first resilient return means bears against said second faces of said first and second plates in zones which are closer to the edges near said first hinge means than are said first adjustable abutment means.

6. A device according to claim 1, wherein said first adjustable abutment means includes a first screw threadably connected to said first plate by a first threaded hole through said first plate, one end of said first screw being rounded for abutting against said second plate.

7. A device according to claim 6, wherein the first threaded hole extends through a body projecting away from the second face of said first plate.

8. A device according to claim 7, wherein said body projecting from the second face of the first plate is a cylinder fixedly attached to said first plate.

9. A device according to claim 1, further comprising a third plate having first and second faces for supplying the optical component to said second plate, said third plate hingedly connected to the second face of said second plate at a second edge of said second plate, said second edge being perpendicular to the edge along which the first hinge means is located;
   a second hinge means for rotating said third plate and the optical component relative to the second plate about a second axis of relative rotation and for maintaining the optical component at a selected orientation, said second hinge means including,
   first and second grooves formed in facing portions of the second face of the second plate and the first face of the third plate, respectively, said grooves being formed along said second edge along said second axis of relative rotation between said second and third plates,
   a second body of revolution constituting the second axis of relative rotation between said second and third plates, said second body of revolution cooperating with surfaces of said first and second grooves of said second hinge means,
   a second resilient return means including a U-shaped clip fitted astride said body of revolution and bearing against the second face of the second plate and the first face of the third plate, said second resilient return means insuring contact between said second body of revolution and the surfaces of said grooves and urging rotation between said second and third plates to a closed parallel, removal of said second resilient return means permitting an easy replacement of said second and third plates; and
   a second adjustable abutment means opposing return action of said second resilient return means, wherein said second hinge means is controllable independently from said first hinge means.

10. A device according to claim 9, wherein said first and second grooves of said second hinge means are V-shaped in cross-section.

11. A device according to claim 9, wherein said second body of revolution of said second hinge means comprises cylindrical rod.

12. A device according to claim 11, wherein said second adjustable abutment means is remote from the edges of said second and third plates near which said second hinge means is located.

13. A device according to claim 12, wherein said second resilient return means of said second hinge means bears against said first face of said second plate and the second face of said third plate in zones which are closer to the edges near said second hinge means than are said second adjustable abutment means.

14. A device according to claim 9, wherein said second adjustable abutment means includes a second screw threadably connected to said second plate by a second threaded hole through said second plate, one end of said second screw being rounded for abutting against said third plate.

15. A device according to claim 14, wherein the second threaded hole also extends through a cylindrical body projecting away from the first face of said second plate.

16. A device for orienting an optical component comprising:
 a first plate having first and second faces;
 a second plate having first and second faces hingedly connected to said first plate;
 a third plate having first and second faces and hingedly connected to said second plate;
 a fourth plate hingedly connected to said third plate having first and second faces, for receiving an optical component;
 first hinge means for hingedly connecting first faces of said first and second plates along a first hinge edge of said first and second plates;
 second hinge means for hingedly connecting the second face of said second plate to the first face of said third plate along a second hinge edge of said second plate, said second hinge edge being perpendicular to the first hinge edge;
 third hinge means for connecting the second face of said third plate to the first face of said fourth plate along a third hinge edge of said third plate, which is perpendicular to the first and second hinge edges;
 wherein each of said first, second and third hinge means respectively includes,
  first and second grooves formed in facing portions of the faces of respective hinging plates, said grooves formed along an axis of relative rotation between said hinging plates,
  a body of revolution constituting the axis of relative rotation between said respective hinging plates, said body of revolution cooperating with surfaces of said first and second grooves,
  a resilient return means including a U-shaped clip fitted astride said body of revolution and bearing against nonhinging faces respective to each of said hinge means, said resilient return means insuring contact between said body of revolution and the surfaces of said grooves and urging rotation between said respective hinging plates to a parallel direction, removal of said resilient return means permitting an easy replacement of said respective hinging plates; and
  first, second and third adjustable abutment means corresponding to said first, second and third hinge means, respectively, for opposing return action of respective resilient return means.

17. A device according to claim 16, wherein said first and second grooves of said first, second and third hinge means are V-shaped in cross-section.

18. A device according to claim 16, wherein said body of revolution of said first, second and third hinge means comprises a cylindrical rod.

19. A device according to claim 18, wherein each of said adjustable abutment means is remote from corresponding resilient return means, the return action of which is opposed by each of said adjustable abutment means.

20. A device according to claim 19, wherein each of said resilient return means bears against zones which are closer to the edges near its respective hinge means than are its corresponding adjustable abutment means.

21. A device according to claim 16, wherein each of said adjustable abutment means includes a screw threadably connected to said first plate by a threaded hole through its corresponding plate, one end of said screw being rounded for abutting against an opposite plate.

22. A device according to claim 21, wherein each of the threaded holes extends through a body projecting away from its corresponding plate opposite the opposite plate.

23. A device according to claim 22, wherein each of said bodies projecting from its corresponding plate is a cylinder fixedly attached to its corresponding plate.

* * * * *